United States Patent
Reichel et al.

(10) Patent No.: US 8,673,047 B2
(45) Date of Patent: Mar. 18, 2014

(54) PROCESS FOR PRODUCING FOAMED SLAG

(75) Inventors: Johann Reichel, Duesseldorf (DE); Lutz Rose, Duisburg (DE)

(73) Assignee: SMS Siemag AG, Duesseldorf (DE)

( * ) Notice: Subject to any disclaimer, the term of this patent is extended or adjusted under 35 U.S.C. 154(b) by 243 days.

(21) Appl. No.: 13/002,915

(22) PCT Filed: Jul. 3, 2009

(86) PCT No.: PCT/DE2009/000951
§ 371 (c)(1),
(2), (4) Date: May 6, 2011

(87) PCT Pub. No.: WO2010/003401
PCT Pub. Date: Jan. 14, 2010

(65) Prior Publication Data
US 2011/0197708 A1 Aug. 18, 2011

(30) Foreign Application Priority Data
Jul. 7, 2008 (DE) .......................... 10 2008 032 975

(51) Int. Cl.
*C21C 5/54* (2006.01)
(52) U.S. Cl.
USPC ........................... 75/10.46; 75/10.61; 65/20
(58) Field of Classification Search
USPC .................. 75/10.46, 10.61; 65/20
See application file for complete search history.

(56) References Cited

U.S. PATENT DOCUMENTS

| | | | | |
|---|---|---|---|---|
| 5,916,827 | A * | 6/1999 | Vayda | 44/580 |
| 8,043,401 | B2 * | 10/2011 | Reichel et al. | 75/10.24 |
| 2006/0260435 | A1 * | 11/2006 | Rose et al. | 75/10.61 |
| 2009/0255375 | A1 | 10/2009 | Reichel et al. | |
| 2010/0089202 | A1 | 4/2010 | Reichel et al. | |

FOREIGN PATENT DOCUMENTS

| | | |
|---|---|---|
| WO | WO 2004/104232 | 12/2004 |
| WO | WO 2007/087979 | 8/2007 |
| WO | WO 2008/095575 | 8/2008 |

OTHER PUBLICATIONS

Reichel et al. "Method for reducing a lag on a steel melt produced during production of stainless steel in an electric arc furnace comprises adding pellets or briquettes to the slag and reducing the pellets or briquettes with the metal oxides of the slag". Derwent Acc-No. 2008-J31787. Patent family includes DE 102007006529 A1, published Aug. 14, 2008.*

* cited by examiner

*Primary Examiner* — George Wyszomierski
*Assistant Examiner* — Tima M McGuthry Banks
(74) *Attorney, Agent, or Firm* — Cozen O'Connor

(57) ABSTRACT

A process and material for producing foamed slag by which the foaming of a slag with a high chromium oxide content can be achieved. An electric arc furnace is charged with a mixture of metal oxides and carbon and, below the slag at the metal-slag interface, the metal oxide is reduced by carbon and limestone and becomes thermally discordant. The occurring gases cause the slag to foam due to the formation of bubbles.

16 Claims, 1 Drawing Sheet

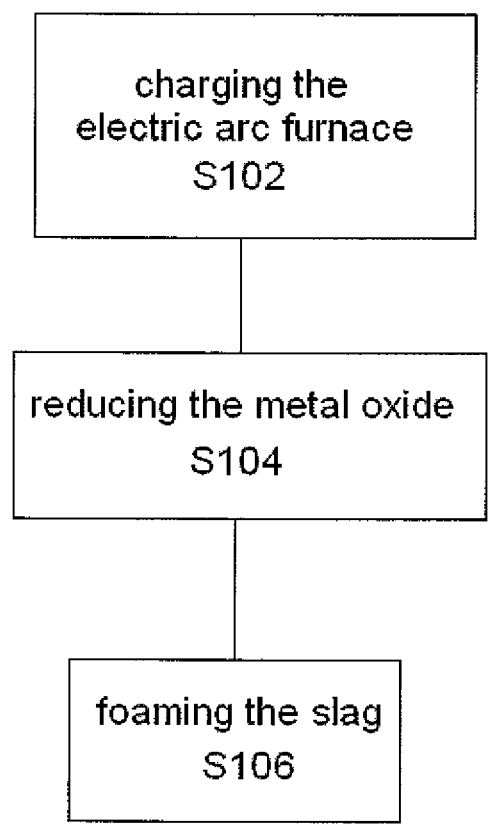

PROCESS FOR PRODUCING FOAMED SLAG

PRIORITY CLAIM

This is a U.S. national stage of Application No. PCT/DE2009/000951, filed on Jul. 3, 2009, which claims priority to German Application No: 10 2008 032 975.4, filed: Jul. 7, 2008, the contents of which are incorporated herein by reference.

BACKGROUND OF THE INVENTION

1. Field of the Invention

The invention is directed to a process for producing foamed slag.

2. Related Art

In steel production in an electric arc furnace, the foaming of slag is one of the most critical processes that affect efficiency of steel production and reduction of production costs.

This method is universally applied in the production of standard carbon steels.

However, the circumstances are different when foaming is applied to steels with a high chromium content because problems are posed by the significant absorption of chromium oxide by the slag. This is a result of the physiochemical properties of slags having a high chromium oxide content. These properties prohibit foaming by conventional methods, for example, by injecting powdered carbon in carrier materials with oxygen into the metal bath or the slag.

While there are known methods for foaming slags with high chromium oxide contents, not all of these methods are satisfactory.

SUMMARY OF THE INVENTION

Therefore, it is an object of one embodiment of the invention to provide a process and material by which foaming can be achieved in a slag with a high chromium oxide content.

One embodiment of the invention is that the material contains iron oxide carriers, carbon carriers, ferrochrome with a high carbon content and/or scrap or nickel oxide (excepting ferritic steel) as an admixture, as well as limestone and possibly, in addition, fluorite, binders such as molasses and/or cement, and additional gas suppliers for the foaming process. This material should take the form of briquettes or pellets of different sizes.

BRIEF DESCRIPTION OF DRAWINGS

FIG. 1 is a flowchart of a process for producing foamed slag according to one embodiment of the invention.

DETAILED DESCRIPTION OF THE DRAWINGS

The foaming of slag in EAF metallurgy offers a range of advantages such as improved thermal efficiency of the furnace due to the low heat conductivity of the foam, reduced consumption of refractory material and electrodes, and stabilization of the electric arc and of the noise level.

The process generally comprises charging an electric furnace (S102). A metal oxide is reduced (S104). The reduced metal oxide forms bubbles that foams the slag (S106).

To achieve efficient foaming, a high level of gas generation must be brought about at the metal-slag interface.

The dominant factors in this connection are CO and $CO_2$ as foam-generating gases.

These gases are formed by the reduction of iron oxide and chromium oxide and by the thermal decomposition of limestone in the following way:

$$Fe_2O_3 + 3C = 2Fe + 3CO \tag{1}$$

$$FeO + C = Fe + CO \tag{2}$$

$$Cr_2O_3 + 3C = 3CO + 2Cr \tag{3}$$

$$CrO + C = Cr + CO \tag{4}$$

$$CaCO_3 = CaO + CO_2 \tag{5}$$

The degree of reduction of the iron oxide by carbon is very high in these reactions, while the reduction of chromium oxide by carbon is less efficient.

It should be noted that the slags in the production of stainless steel contain very little iron oxide but a large amount of chromium oxide so that the low efficiency of CO production in such slags is understandable. It may be possible to achieve a more efficient generation of gas by the deliberate addition of synthetics such as cinder and limestone.

The specific density of the additions plays an important part in foam development in comparison to that of the slag or metal. It assists in moving the gas-generating reaction to the slag-metal interface so that foaming is more efficient and can be better controlled. The density can be influenced by the suitable selection of very dense materials (metals) or ballast materials, as they are called, such as ferritic scrap and/or ferrochrome as well as less dense materials (oxides).

The principal component in foamers is iron oxide, $Fe_2O_3$, with the addition of carbon as reductant. In this case, the following reaction takes place:

$$Fe_2O_3 + 3C = 2Fe + 3CO, \tag{6}$$

wherein the foam mixture of $Fe_2O_3$ and graphite contains 18.37% graphite with the remainder 81.63% $Fe_2O_3$.

Ferrochrome (FeCr) with a high chromium content, ferritic scrap, and limestone $CaCO_3$ complete the composition.

For slags of austenitic steels, nickel oxide can also be added.

Owing to the high specific density, ferrochrome and ferritic scrap make the foam-forming addition heavier. Therefore, the specific density lies between the specific densities of the slag and the metal as follows:

$$\rho_{slag} < \rho_{material} < \rho_{metal} \tag{7}$$

Accordingly, the material is deliberately positioned at the slag-metal interface due to buoyancy. In so doing, it dissolves in the metal bath so that the bath weight increases.

$CO_2$ is generated by the limestone from thermal decomposition and reinforces the foaming, while calcium oxide dissolves in the slag and raises the viscosity and alkalinity of the slag. In addition, the viscosity of the slag can also be adjusted by the addition of fluorite ($CaF_2$).

The foamer according to one embodiment of the invention comprises basic constituents such as iron oxides ($Fe_2O_3$, $Fe_3O_4$) in any form as cinder, dry converter dust or dry EAF/LF dust, wet converter dust (sludge), and ore;

coke, graphite, and carbon (C);

ballast material for all stainless steel types in the form of FeCr, and ferritic scrap; and ballast material for stainless austenitic and duplex steel types in the form of FeCr, ferritic scrap, austenitic scrap, duplex scrap, and nickel oxides ($NiO_x$).

The additives include:

limestone ($CaCO_3$);

quicklime and fluorite (CaO and CaF$_2$); and
aluminum oxide (Al$_2$O$_3$).
The binders are:
molasses;
cement; or
other possible binders.
The composition of the foamer can be given in percent as follows:

| | |
|---|---|
| Fe$_2$O$_3$, Fe$_3$O$_4$ | 10-70% |
| C | 2-16% |
| ballast material | 14-78% |
| CaCO$_3$ | 0-10% |
| CaO, CaF$_2$ | 0-10% |
| Al$_2$O$_3$ | 0-10%. |

The specific density of the foamer can be determined based on the following assumptions, wherein by Fe$_2$O$_{3,m}$ is meant a mixture of Fe$_2$O$_3$ and graphite:

The specific density of the Fe$_2$O$_{3,m}$ is given by the following formula:

$$\rho_{Fe_2O_3 m} = \rho_{Fe_2O_3} \cdot \frac{\%_{Fe_2O_3}}{100\%} + \rho_C \cdot \frac{\%_C}{100\%} \quad (8)$$

and that of the foamer is given by:

$$\rho = \rho_{Fe_2O_3 m} \cdot \frac{\%_{Fe_2O_3,m}}{100\%} + \rho_{ballast} \cdot \frac{\%_{ballast}}{100\%} + \rho_{CaCO_3} \cdot \frac{\%_{CaCO_3}}{100\%} + \rho_{binder} \frac{\%_{binder}}{100\%} \quad (9)$$

where ballast signifies FeCr or scrap and nickel oxide $$\%_{Fe_2O_3,m} + \%_{ballast} + \%_{CaCO_3} + \%_{binder} = 100\% \quad (10)$$

The CaCO$_3$ content can be replaced by CaF$_2$ content, where it can be assumed in particular that % CaCO$_3$=0 or CaF$_2$=0.

The specific density of the foamer is given in the following Table 1.

TABLE 1

Specific density of the pure, monolithic foamer components used for determining the density of the material

| Component | Fe | Cr | Fe$_2$O$_3$ | C | CaCO$_3$ | CaF$_2$ | FeCr(*) |
|---|---|---|---|---|---|---|---|
| Spec. density, [t/m$^3$] | 7.86 | 7.2 | 5.3 | 2.25 | 2.27 | 3.18 | 4.09 |

| Component | Molasses | Cement | ferritic scrap | NiO$_x$ |
|---|---|---|---|---|
| Spec. density [t/m$^3$] | 0.99 | 2.9 | 6.51 | 6.67 |

54% Cr—35% Fe—8% C—3% Si

The data indicated above for the specific density relates to monolithic material. On the other hand, the material used for foaming is applied in the form of briquettes, whose specific density is, of course, lower.

The briquettes are produced by compressing the material, and different densities are obtained depending on the composition by percent.

The specific density of slags produced in steel production is in the range of 2.5 g/cm$^3$ to 3 g/cm$^3$.

In practice, a compressed composition containing Fe$_2$O$_3$ and carbon in the indicated mixture has a density of 3.2 g/cm$^3$, while calculation yields a density of 4.7 g/cm$^3$ for the individual components. Experiments have shown the slag under consideration has a density of 2.9 g/cm$^3$.

With a view to the desired foam-forming effects, the specific density of the foamer should range from 2.8 t/m$^3$ to 6.0 t/m$^3$.

When the physical dimensions of the additions (pellets or briquettes) are small, the gas is released quickly because the total reaction surface is greater when the dimensions are smaller.

It has already been mentioned that the foam-forming mixture is preferably added in the form of briquettes or pellets. The briquettes are produced in a specially shaped press. The dimensions of the briquettes are advantageously between 20 mm and 100 mm diagonally and 15 mm to 40 mm in height.

Prior to compressing, the pellets or briquettes can be produced in a drum with the addition of molasses or cement. Other binding techniques which ensure the desired properties with respect to hardness, breaking strength and compressive strength are also possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A process for producing a foamed slag on stainless steel melts in an electric arc furnace, comprising:
    charging the electric arc furnace with a mixture of metal oxides and carbon configured as a foamer;
    reducing the metal oxide by the carbon below a slag at a metal-slag interface; and
    foaming the slag due to a formation of bubbles by gases occurring due to the reducing,
    wherein the charge mixture is added in the form of molded articles comprising:
    1) iron oxide in the form of at least one of Fe$_2$O$_3$ and Fe$_3$O$_4$ having a configuration selected from the group consisting of cinder, dry converter dust, dry EAF/LF electric arc furnace/ladle furnace dust, and converter wet dust;
    2) at least one of coke, graphite, and carbon; and
    3) ballast material comprising:
        for all stainless steel types, at least one of FeCr and ferritic scrap, or
        for stainless austenitic and duplex steel types, at least one of FeCr, ferritic scrap, austenitic scrap, duplex scrap, and nickel oxides (NiO$_x$).

2. The process according to claim 1, wherein a composition of the charge mixture is:

| | |
|---|---|
| $Fe_2O_3$, $Fe_3O_4$ | 10%-70%; |
| C | 2%-16%; and |
| ballast material | 14%-78%. |

3. The process according to claim 2, wherein a specific density of the molded articles is adjusted to 2.8 t/m³ to 6.0 t/m³ by selecting the one or more components forming the mixture and by a molding process when producing the molded articles.

4. The process according to claim 3, wherein when producing the molded articles, their diagonal extension is between 20 mm and 100 mm and their height is between 15 mm to 40 mm.

5. The process according to claim 3, wherein the molded articles are configured as one of briquettes and pellets.

6. The process according to claim 5, wherein the briquettes and the pellets have a diagonal extension between 20 mm and 100 mm and a height between 15 mm to 40 mm.

7. The process according to claim 1, wherein a specific density of the molded articles is adjusted to 2.8 t/m³ to 6.0 t/m³ by selecting the one or more components forming the mixture and by a molding process when producing the molded articles.

8. The process according to claim 7, wherein the molded articles are configured as one of a briquettes and a pellets.

9. The process according to claim 8, wherein the briquettes and the pellets have a diagonal extension between 20 mm and 100 mm and a height between 15 mm to 40 mm.

10. The process according to claim 1, wherein the charge mixture further comprises one or more of the following additives:

limestone ($CaCO_3$);
quicklime (CaO) or fluorite ($CaF_2$);
ferrosilicon (FeSi);
aluminum (Al); and
aluminum oxide ($Al_2O_3$).

11. The process according to claim 10, further comprising a binder.

12. The process according to claim 11, wherein the binder is at least one of molasses and cement.

13. The process according to claim 11, wherein a specific density of the molded articles is adjusted to 2.8 t/m³ to 6.0 t/m³ by selecting the one or more components forming the mixture and by a molding process when producing the molded articles.

14. The process according to claim 10, wherein the composition of the charge mixture comprises:

| | |
|---|---|
| $Fe_2O_3$, $Fe_3O_4$ | 10%-70%; |
| C | 2%-16%; |
| ballast material | 14%-78%; |
| $CaCO_3$ | 0-10%; |
| CaO, $CaF_2$ | 0-10%; |
| FeSi | 0-10%; |
| Al | 0-10%; and |
| $Al_2O_3$ | 0-10%. |

15. The process according to claim 1, wherein the charge mixture further comprises a binder.

16. The process according to claim 15, wherein the binder is at least one of molasses and cement.

* * * * *